United States Patent
Bergström et al.

(10) Patent No.: US 10,575,247 B2
(45) Date of Patent: *Feb. 25, 2020

(54) NETWORK ACCESS THROUGH A SECOND WIRELESS NETWORK

(71) Applicant: GUANGDONG OPPO MOBILE TELECOMMUNICATIONS CORP., LTD., Dongguan (CN)

(72) Inventors: Andreas Bergström, Vikingstad (SE); Martin Hessler, Linköping (SE); Eric Nordström, Stockholm (SE); Paul Schliwa-Bertling, Ljungsbro (SE)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,459

(22) Filed: Aug. 21, 2018

(65) Prior Publication Data

US 2018/0359693 A1    Dec. 13, 2018

Related U.S. Application Data

(63) Continuation of application No. 14/410,383, filed as application No. PCT/SE2013/051565 on Dec. 19, 2013, now Pat. No. 10,455,490.

(51) Int. Cl.
*H04W 4/00*    (2018.01)
*H04W 48/18*    (2009.01)
(Continued)

(52) U.S. Cl.
CPC ....... *H04W 48/18* (2013.01); *H04W 36/0066* (2013.01); *H04W 36/12* (2013.01);
(Continued)

(58) Field of Classification Search
CPC . H04W 48/18; H04W 36/0066; H04W 36/12; H04W 88/06
(Continued)

(56) References Cited

U.S. PATENT DOCUMENTS 6,353,737 B1    3/2002   Herzog
6,512,741 B1    1/2003   Kohzuki et al.
(Continued)

FOREIGN PATENT DOCUMENTS

CN    101155404 A    4/2008
CN    102742322 A    10/2012
(Continued)

OTHER PUBLICATIONS

3GPP, "3rd Generation Partnership Project; Technical Specification Group Radio Access Network; Evolved Universal Terrestrial Radio Access (E-UTRA); LTE coverage enhancements (Release 11)", 3GPP TR 36.824 V11.0.0, Jun. 1-18, 2012.
(Continued)

*Primary Examiner* — Marceau Milord
(74) *Attorney, Agent, or Firm* — Finnegan, Henderson, Farabow, Garrett & Dunner LLP

(57) ABSTRACT

Techniques for accessing wireless networks relate to utilizing a second wireless network for enabling a wireless device, being unable to access a first wireless network, to access a first wireless network. An example embodiment comprises a method performed in a wireless device being unable to access a first wireless network. The method comprises accessing a second wireless network and sending information indicating an inability to access the first wireless network to the second wireless network, for further distribution to the first wireless network. Thereby, the method enables the first wireless network to reconfigure at least one access procedure parameter in the first wireless network in
(Continued)

order to improve the conditions for the wireless device when accessing the first wireless network. The method further comprises accessing the first wireless network utilizing at least one reconfigured access procedure.

20 Claims, 11 Drawing Sheets

(51) Int. Cl.
  *H04W 48/08* (2009.01)
  *H04W 36/00* (2009.01)
  *H04W 36/12* (2009.01)
  *H04W 74/00* (2009.01)
  *H04W 88/06* (2009.01)

(52) U.S. Cl.
  CPC .......... *H04W 48/08* (2013.01); *H04W 74/006* (2013.01); *H04W 88/06* (2013.01)

(58) Field of Classification Search
  USPC .............................. 455/435.2, 63.1
  See application file for complete search history.

(56) References Cited

U.S. PATENT DOCUMENTS

| | | | | |
|---|---|---|---|---|
| 7,027,400 | B2* | 4/2006 | O'Neill | H04L 12/185 370/235 |
| 8,000,241 | B2* | 8/2011 | O'Neill | H04L 12/185 370/235 |
| 8,676,909 | B2 | 3/2014 | Guyot et al. | |
| 8,913,518 | B2 | 12/2014 | Heo et al. | |
| 8,929,894 | B2 | 1/2015 | Catovic et al. | |
| 8,934,336 | B2* | 1/2015 | Ramachandran | H04W 76/027 370/221 |
| 8,958,342 | B2 | 2/2015 | Dinan | |
| 9,191,326 | B2 | 11/2015 | Han et al. | |
| 9,237,490 | B2 | 1/2016 | Pereira et al. | |
| 9,258,839 | B2* | 2/2016 | Rayavarapu | H04W 76/19 |
| 9,295,095 | B2 | 3/2016 | Rayavarapu | |
| 9,301,183 | B2 | 3/2016 | Heo et al. | |
| 9,307,566 | B2* | 4/2016 | Andre-Jonsson | H04W 76/18 |
| 9,319,194 | B2 | 4/2016 | Dinan | |
| 9,344,932 | B2 | 5/2016 | Jung et al. | |
| 9,344,937 | B2 | 5/2016 | Jung et al. | |
| 9,351,205 | B2 | 5/2016 | Ji et al. | |
| 9,357,460 | B2 | 5/2016 | Yamada | |
| 9,363,829 | B2 | 6/2016 | Di Girolamo et al. | |
| 9,380,568 | B2 | 6/2016 | Harrison et al. | |
| 9,386,608 | B2 | 7/2016 | He et al. | |
| 9,591,631 | B2 | 3/2017 | You et al. | |
| 9,736,735 | B2 | 8/2017 | Jung et al. | |
| 9,756,678 | B2* | 9/2017 | Yamada | H04W 36/0072 |
| 9,763,179 | B2 | 9/2017 | Pragada et al. | |
| 9,924,460 | B2* | 3/2018 | Walldeen | H04W 48/02 |
| 9,955,419 | B2* | 4/2018 | Schliwa-Bertling | H04W 48/02 |
| 10,009,837 | B2* | 6/2018 | Hedman | H04W 36/0022 |
| 2010/0002579 | A1 | 1/2010 | Shi et al. | |
| 2010/0054135 | A1 | 3/2010 | Rahman et al. | |
| 2010/0302009 | A1 | 12/2010 | Hoeksel et al. | |
| 2010/0316000 | A1* | 12/2010 | Burbidge | H04W 36/0022 370/328 |
| 2010/0316034 | A1* | 12/2010 | Burbidge | H04W 36/0022 370/338 |
| 2010/0317315 | A1* | 12/2010 | Burbidge | H04W 36/0022 455/404.1 |
| 2010/0317347 | A1* | 12/2010 | Burbidge | H04W 36/0088 455/436 |
| 2010/0317348 | A1* | 12/2010 | Burbidge | H04W 36/0066 455/436 |
| 2010/0317375 | A1 | 12/2010 | Burbidge et al. | |
| 2011/0188468 | A1* | 8/2011 | Vikberg | H04W 36/0066 370/331 |
| 2011/0235559 | A1 | 9/2011 | Sakoda et al. | |
| 2012/0039214 | A1* | 2/2012 | Kim | H04L 12/14 370/254 |
| 2012/0170548 | A1* | 7/2012 | Rajagopalan | H04W 36/22 370/331 |
| 2012/0173901 | A1 | 7/2012 | Soliman et al. | |
| 2013/0064092 | A1 | 3/2013 | Xi et al. | |
| 2013/0142136 | A1* | 6/2013 | Pi | H04W 28/0289 370/329 |
| 2013/0303164 | A1* | 11/2013 | Seo | H04W 76/18 455/435.1 |
| 2013/0322390 | A1 | 12/2013 | Xu et al. | |
| 2014/0018085 | A1* | 1/2014 | Young | H04W 52/0235 455/450 |
| 2014/0146732 | A1 | 5/2014 | Olufunmilola et al. | |
| 2014/0248882 | A1* | 9/2014 | Wang | H04W 24/04 455/436 |
| 2014/0301360 | A1 | 10/2014 | Bontu et al. | |
| 2014/0313907 | A1 | 10/2014 | Wang et al. | |
| 2015/0031363 | A1 | 1/2015 | Kordybach et al. | |
| 2015/0172907 | A1* | 6/2015 | Jung | H04W 24/10 370/329 |
| 2015/0195795 | A1* | 7/2015 | Loehr | H04W 52/365 455/522 |
| 2015/0249972 | A1 | 9/2015 | You et al. | |
| 2016/0269986 | A1* | 9/2016 | Bergstrom | H04W 48/08 |
| 2016/0278160 | A1* | 9/2016 | Schliwa-Bertling | H04W 48/02 |
| 2017/0295546 | A1* | 10/2017 | Young | H04W 52/0235 |

FOREIGN PATENT DOCUMENTS

| | | |
|---|---|---|
| WO | 2011014730 A2 | 2/2011 |
| WO | 2012100837 A1 | 8/2012 |
| WO | 2013024001 A1 | 2/2013 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.6.0, Jun. 2012, 1-125.

* cited by examiner

NETWORK ACCESS THROUGH A SECOND WIRELESS NETWORK

RELATED APPLICATIONS

The present application is a continuation of U.S. patent application Ser. No. 14/410,383, filed 22 Dec. 2014, which is a national stage entry under 35 U.S.C. § 371 of international patent application serial number PCT/SE2013/05156, filed 19 Dec. 2013. The entire contents of each of the foregoing applications is incorporated herein by reference.

TECHNICAL FIELD

The proposed technology relates to accessing wireless networks and in particular it relates to utilizing a second wireless network for enabling a wireless device to access a first wireless network. The proposed technology also relates to methods for enabling access to a first wireless network, a wireless device and nodes for implementing the methods and to a corresponding computer program.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNodeB or eNodeB, in LTE. An RBS is a general term for a radio network node capable of transmitting radio signals to a UE and receiving signals transmitted by a UE.

It has been discussed during the work done on 3GPP Coverage Enhancements TR 36.824, v11.0.0 that there may be situations where an E-UTRAN UE is unable to access the network due to E-UTRAN Random Access Channel, RACH, coverage problems, i.e., the UE may have Broadcast Control Channel, BCCH, coverage and can measure on the cell and read its system information, but the network cannot receive any random access preamble attempts from the UE because the UE is power/coverage limited and hence the received signal in the network is thus too weak. Hence, the UE cannot connect to the E-UTRAN domain of the radio network.

A similar scenario as described above may occur, when the RACH coverage limitation of the first cell is caused by the fact that massive beam forming is required in order to provide users in the cell with coverage. This could be the situation if the first RAT is, e.g., a future 5G cell operating in quite high frequency bands.

The "Mobile and Wireless Communications Enablers for the Twenty-twenty (2020) Information Society", METIS, is a project co-founded by the European Commission and is a consortium of 29 partners. The project objective is to respond to societal challenges for the year 2020 and beyond by laying the foundation for the next generation of the mobile and wireless communications system. The frequencies being discussed for 5G in, e.g., the METIS project, are much higher than what is commonly used for 3GPP accesses today—suggestions have been made for carrier frequencies >60 GHz.

In this frequency region, it will be almost impossible for network and UEs more than a few steps away from the network antenna to hear each other without the use of, e.g., advanced multi-antenna techniques such as very directive beam forming. It will hence not be feasible to create a covering cell/sector which can be used for, e.g., RACH purposes in this scenario.

Hence, there is a need for methods of enabling access to a network when a UE knows about a network, because it can, e.g., measure on the cell and read its system information, but the network cannot receive any random access preamble attempts from the UE because the UE is, e.g., power/coverage limited and hence the received signal in the network is thus too weak.

SUMMARY

The present disclosure proposes a general method for accessing a network when a wireless device, e.g., a user equipment, UE, knows about a wireless network because it can, e.g., measure on a cell and read its system information, but is unable to access it.

According to one embodiment, this disclosure proposes for a UE in the situation as outlined above, to acquire E-UTRAN access with the help of the GERAN random access procedures, and hence effectively extend the coverage of the E-UTRAN cell.

In the similar scenario, where the random access coverage limitation of the first cell is rather due to the fact that massive beam forming is required in order to provide users in the cell with coverage as explained above, it is also likely that coverage is provided by a lower frequency layer of the same, or another, RAT. Hence, a similar solution is applicable also in this case.

Hence, this disclosure is, e.g., based on the idea to use signaling through a second wireless network implementing a second RAT (e.g. GERAN) for requesting a reconfiguration of a first wireless network implementing a first RAT (e.g. E-UTRAN) for better coverage, for example, by changing settings for carriers, antennas, pre-coding, repetition coding or other means to improve coverage of the E-UTRAN network.

According to one aspect, the proposed technique provides for a method, performed in a wireless device being unable to access a first wireless network, of accessing the first wireless network. The method comprises accessing a second wireless network and sending information indicating an inability to access the first wireless network to the second wireless network, for further distribution to the first wireless network. Thereby, the proposed method enables the first wireless network to reconfigure at least one access procedure parameter in the first wireless network in order to improve the conditions for the wireless device when accessing first wireless network. The method further comprises accessing the first wireless network utilizing at least one reconfigured access procedure. The proposed method effectively enhances the coverage for a multi-RAT (e.g. GERAN and E-UTRAN) capable wireless device by using a second wireless network to provide access coverage and allows a swift handover/network controlled mobility. Hence, a wireless device may now be able to move from the second wireless network to the first wireless network much sooner than was previously possible. Alternatively, the wireless device may now be able to move from the second wireless network to the first wireless network, whereas this would not have been possible at all before.

According to one aspect, the method further comprises receiving, from the second wireless network, information associated with at least one access procedure of the first wireless network. This information is typically utilized by the wireless device in order to improve the conditions for the wireless device when attempting to access the first wireless network.

According to one aspect the received information comprises information about at least one access resource or preamble, which is reserved for the wireless device and the step of accessing the first wireless network, comprises using the reserved access resource or preamble. By reserving resources or preambles for random access interference is decreased and the conditions for the wireless device when accessing first wireless network are improved.

According to one aspect the received information comprises precoding information wherein the step of accessing the first wireless network comprises using the received precoding information. By changing the precoding it is, e.g., possible to direct the access transmission in a favorable direction.

According to one aspect, the method further comprises sending information to be used in at least one access procedure in the first wireless network to the second wireless network for further distribution to the first wireless network 100. In this way, e.g., measurement reports made by the wireless device on at least one signal transmitted from the first wireless network may be provided in the first wireless network, thereby improving the conditions for the wireless device when accessing the first wireless network 100.

The mechanisms to schedule measurements in the downlink and/or uplink for a UE in GERAN, together with the possibility to provide contention-free access in the target E-UTRAN cell, enables the network to avoid doing an erroneous handover and thus, for example, losing coverage to the UE when the E-UTRAN radio conditions are non-favorable for doing a GERAN to E-UTRAN handover. Hence, inter-RAT handover performance will be improved. This will also be beneficial when doing, for example, performance optimization of inter-RAT load balancing since the load balancing will impose additional handover signaling.

According to another aspect, this disclosure also makes it possible to use a non-5G RAT to provide RACH coverage for a 5G RAT cell, which can be assumed to be operated in the high frequency bands where the coverage is extremely limited without the use of, e.g., extensive beam-forming. By this disclosure, it is hence possible to use another RAT (e.g. E-UTRAN/UTRAN/GERAN) to provide this for the 5G RAT cell.

According to one aspect, the disclosure further relates to a computer program comprising computer program code which, when executed in a wireless device, causes the wireless device to execute the methods as described above.

According to another aspect, the disclosure relates to a method performed in a first network node or in several network nodes, in a first wireless network. The method relates to enabling a wireless device being unable to access the first wireless network to access the first wireless network. The method comprises receiving from a second wireless network information indicating an inability of the wireless device to access the first wireless network, and reconfiguring an access procedure or procedures provided in the first wireless network based on the received information. According to one aspect, the at least one access procedure parameter is reconfigured such that coverage of the first wireless network is modified to provide coverage for the wireless device.

According to one aspect, the method further comprises sending information associated with the at least one access procedure of the first wireless network to the second wireless network for further distribution to the wireless device.

According to one aspect, the information comprises information about at least one access resource or preamble which is reserved for the wireless device. According to one aspect, wherein the information comprises a request for the wireless device to transmit at least one reference signal. According to one aspect, the method further comprises receiving, from the second wireless network, information to be used in at least one access procedure in the first wireless network.

According to one aspect, the step of reconfiguring the access procedure or procedures comprises reconfiguring the coding or resources to be used for accessing the first wireless network. Thereby, scheduled resources may be reserved for the wireless device, wherein the chance to access the network increases due to less interference.

According to one aspect, the step of reconfiguring the access procedure or procedures comprises informing the receiver of the radio network node about the precoding used by the wireless device.

According to one aspect, the disclosure further relates to a computer program comprising computer program code which, when executed in a first wireless network node causes the first network node to execute the method claimed above.

According to another aspect, the disclosure relates to a method performed in a second wireless network node, or in several network nodes, in a second wireless network of enabling a wireless device being unable to access a first wireless network to access the first wireless network. The method comprises receiving from the wireless device information indicating an inability to access the first wireless network and sending to the first wireless network information indicating an inability of the wireless device to access to the first wireless network, thereby enabling the first wireless network to reconfigure the access procedure parameter in the first wireless network to increase the coverage for the device.

According to another aspect, the method further comprises indicating a capability to assist a wireless device in accessing the first wireless network.

According to another aspect, the method in a second network node further comprises
tunneling information associated with at least one access procedure of the first wireless network, from the first wireless network to the wireless device or from the wireless device to the first wireless network.

According to one aspect, the disclosure further relates to a computer program comprising computer program code which, when executed in a second wireless network node, causes the network node to execute the method as described above.

According to another aspect, the disclosure relates to a wireless device configured to access a first wireless network, wherein the wireless device is unable to access the first wireless network. The wireless device comprises a radio communication interface configured to communicate with a first radio network node in the first wireless network and with a second radio network node in a second wireless network. The wireless device further comprises processing circuitry configured to cause the wireless device to access a second wireless network, send information indicating an inability to access the first wireless network to the second wireless network, for further distribution to the first wireless network, thereby enabling the first wireless network to reconfigure at least one access procedure parameter in the first wireless network in order to improve the conditions for the wireless device when accessing first wireless network and access the first wireless network utilizing at least one reconfigured access procedure.

According to another aspect, the disclosure relates to a first network node in a first wireless network, configured to enable a wireless device, being unable to access the first wireless network, to access the first wireless network. The first wireless network node comprises a radio communication interface configured to communicate with the wireless device, a network communication interface configured to communicate with a second wireless network. The a first network node further comprises processing circuitry configured to cause the first network node to receive, using the network communication interface, from the second wireless network information indicating an inability of the wireless device to access the first wireless network, and reconfigure at least one access procedure parameter in the first wireless network based on the received information.

According to another aspect, the disclosure relates to a second network node in a second wireless network configured to enable a wireless device being unable to access a first wireless network to access the first wireless network. The second wireless network node comprises a radio communication interface configured to communicate with the wireless device and a network communication interface configured to communicate with a first wireless network. The second wireless network node further comprises a processing circuitry configured to cause the second network node to receive, using the radio communication interface, from the wireless device information indicating an inability to access the first wireless network and send, using the network communication interface, to the first wireless network information indicating an inability of the wireless device to access to the first wireless network, thereby enabling the first wireless network to reconfigure at least one access procedure parameter in the first wireless network to increase the coverage for the wireless device.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

This disclosure proposes using signaling through a second wireless network, typically implementing a second radio access technology, for requesting reconfiguration of at least one random access procedure or a parameter of a random access procedure of a first wireless network for better access condition. For example, coverage of the first wireless network may be increased by changing settings for carriers, antennas, pre-coding, repetitions or other means to improve coverage of the first wireless network.

Consider the situation when this UE is a multi Radio Access Technology, RAT, capable device capable of not only Evolved UMTS Terrestrial Radio Access Network, E-UTRAN, but also another RAT, e.g., GSM/EDGE Radio Access Network, GERAN, and also that this UE is in GERAN coverage but still is E-UTRAN coverage limited as described above. In this situation, this multi-RAT capable UE will indeed be able to perform GERAN random access, and connect to the GERAN domain of the radio network. The UE will however not be able to access the E-UTRAN until the E-UTRAN radio conditions are more favorable, e.g., until it has moved to a position closer to the E-UTRAN base station.

In this application the term wireless device is generally used. A wireless device, or user equipment, UE, which is the term used in the 3GPP specifications, referred to in this application could be any wireless device capable of communicating with a wireless network. Examples of such devices are of course mobile phones, smartphones, laptops and Machine to Machine, M2M, devices etc. However, one must appreciate that capability to communicate with a wireless network could be built in almost any device, e.g., a car, a lamp post, a scale and so on.

Figure 1A:
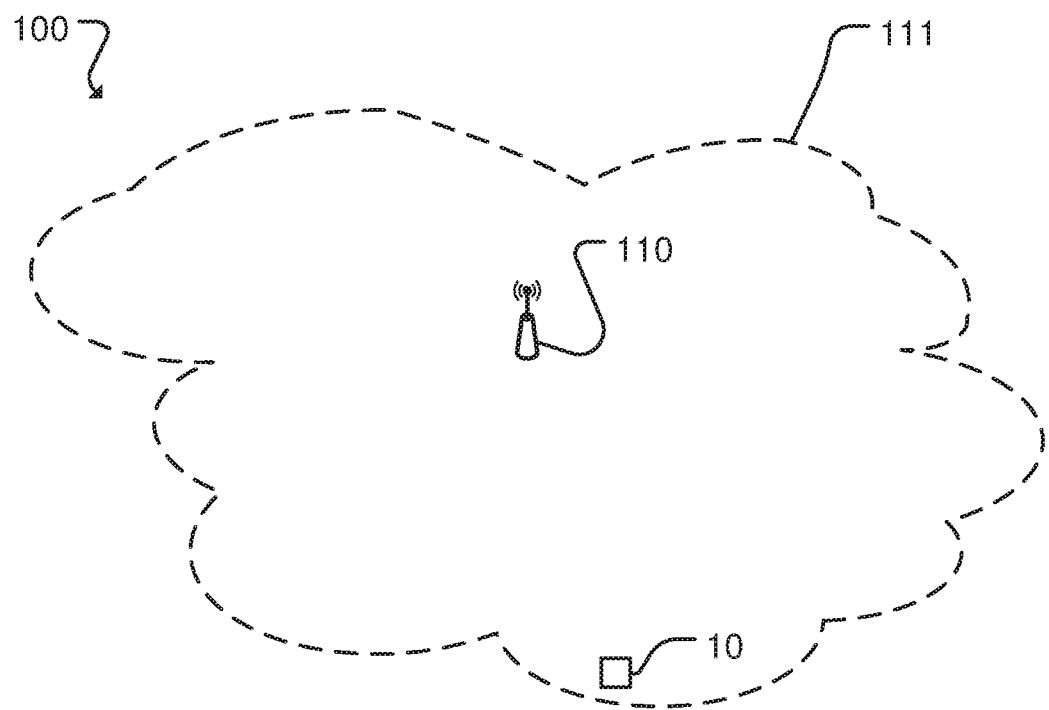
FIG. 1a illustrates a cell of a first wireless network, wherein the coverage of the first wireless network is limited for a wireless device.
Figure 1B:
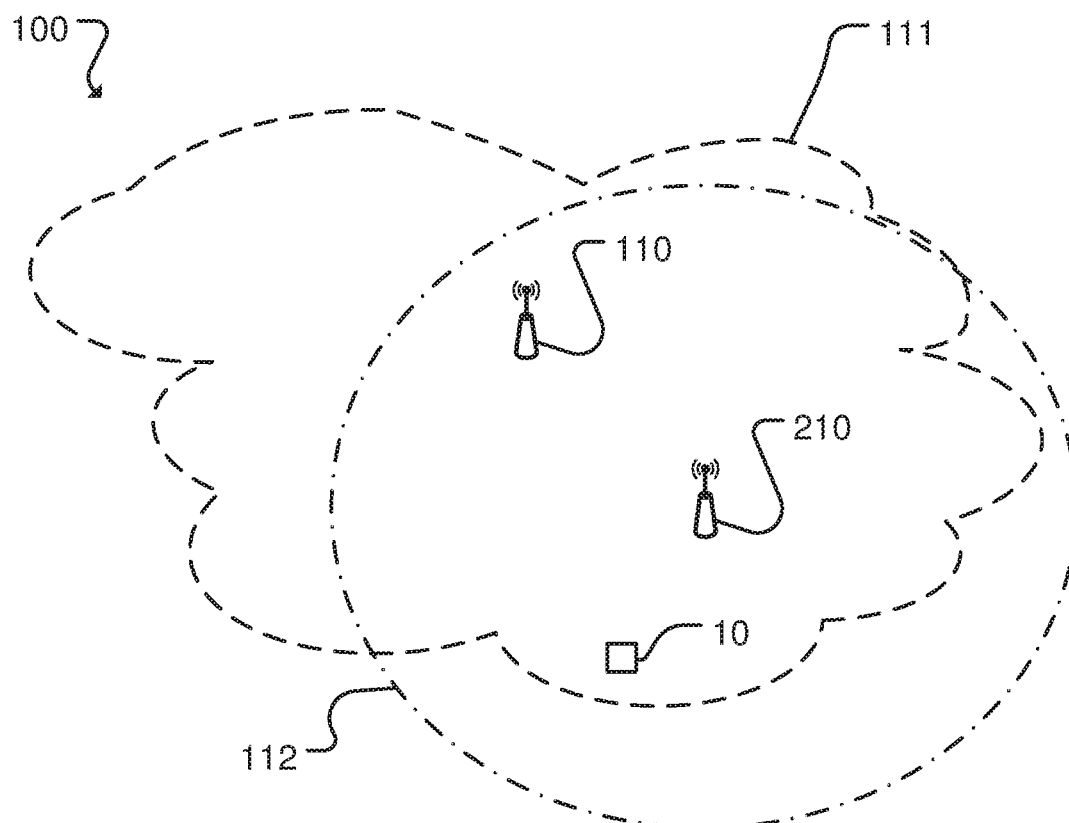
FIG. 1b shows the first wireless network of FIG. 1a, wherein in addition a second wireless network is present and wherein the coverage of the second wireless network is good for the wireless device.

FIGS. 1a and 1b illustrate a cell 111 of a first wireless network 100, wherein the proposed technique may be implemented. In FIG. 1a coverage of the first wireless network 100 is limited for a wireless device 10, being very close to the cell border. The first wireless network is, e.g., an Evolved UMTS Terrestrial Radio Access Network, E-UTRAN or a 5th Generation wireless network. Thus, the wireless device 10 attempts to access the first wireless network, e.g., by an E-UTRAN Random Access Attempt, but fails to connect to the network.

FIG. 1b shows the first wireless network 100 of FIG. 1a, wherein, in addition, a second wireless network 200 is present. The coverage of the second wireless network 200 is good for the wireless device 10. The second wireless network is, e.g., GSM/EDGE Radio Access Network, GERAN or an Evolved UMTS Terrestrial Radio Access Network, E-UTRAN. Thus, a wireless device 10 attempting to access the first wireless network, e.g., using an E-UTRAN Random Access Attempt, fails. However, the device is able to access the second wireless network.

The example embodiments below are partly using the example wherein the first wireless network is E-UTRAN and wherein the second wireless network is GERAN. Therefore, the random access procedure in an E-UTRAN will now be described in more detail. However, it must be anticipated that the problems and solutions described in this application can be extended to other first/second RATs than LTE/GERAN and 5G/LTE.

In 3GPP Release 11, the Long Term Evolution, LTE, random access procedure is a four step procedure used for initial access when establishing a radio link, to re-establish a radio link after radio-link failure, to establish uplink synchronization or as a scheduling request if no dedicated scheduling-request resources have been configured on the Physical Uplink Control Channel, PUCCH.

Figure 2A:
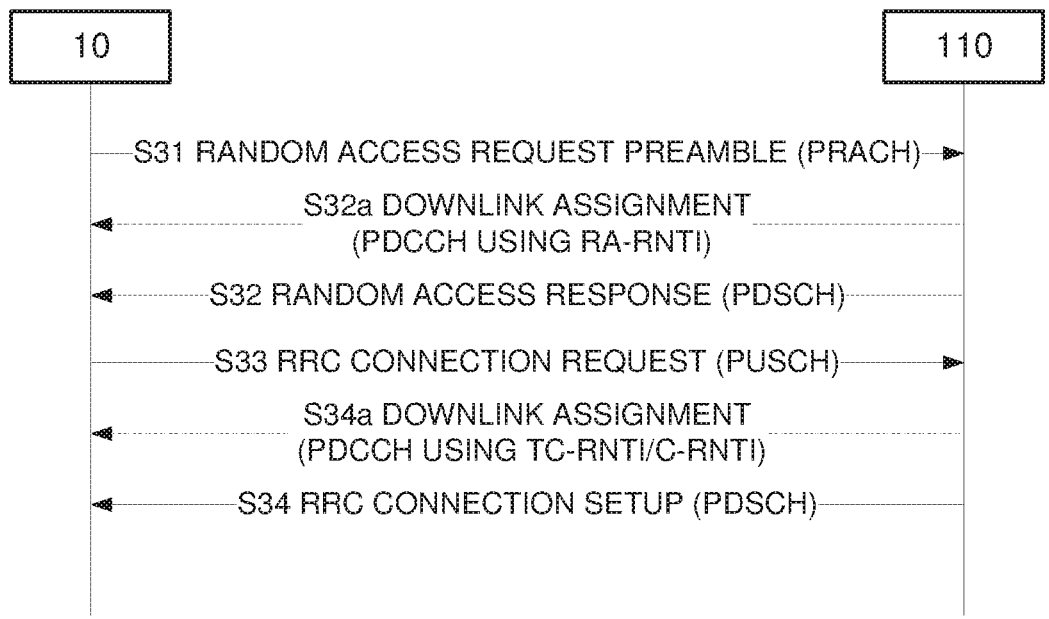
FIG. 2a illustrates the sequence of messages exchanged between a device and an eNodeB during a random access procedure.

3GPP Release 11 provides for a LTE random access procedure which is used in several situations: for initial access when establishing a radio link (moving from Radio Resource Control (RRC) _IDLE to RRC_CONNECTED state); to re-establish a radio link after radio-link failure; to establish uplink synchronization; or, as a scheduling request if no dedicated scheduling-request resources have been configured on the Physical Uplink Control Channel, PUCCH. The 3GPP Release 11 LTE random access procedure essentially comprises four basic steps which encompass a sequence of messages exchanged between the terminal and the eNodeB, as generally illustrated in FIG. 2a. In FIG. 2a, the four steps essentially correspond to the solid arrows, whereas the dotted arrows essentially correspond to control signaling for the solid arrow step which the dotted arrows precede. For example, the second step is the second arrow S32a and the third arrow S32. The second arrow S32a tells the UE to listen to the third arrow S32 corresponding to the second step. Further in the same way the fifth arrow S34a tells the UE to listen to the fourth step in the RA-procedure corresponding to the last arrow S34. These basic four steps are briefly discussed below.

Figure 2B:
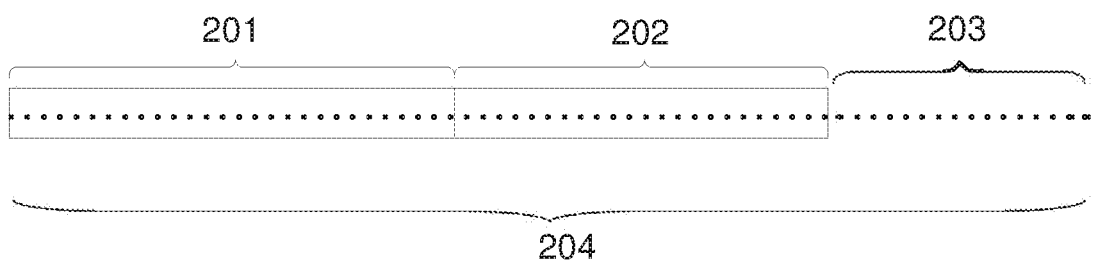
FIG. 2b illustrates two preamble subsets defined for random access.

A first step S31 in the random-access procedure comprises transmission of a random-access preamble on the Physical Random-Access Channel, PRACH. As part of the first step of the random-access procedure, the terminal randomly selects one preamble to transmit, out of one of the two subsets 201, 202 defined for contention-based access as illustrated in FIG. 2b. In LTE totally 64 preambles 204 are defined in each cell, When contention-based setup is used there is a risk for collision of two UEs accessing the same resource. The subsets used for contention free setup 203 can be used, e.g., at handover, where there is no risk for collision, i.e., when the terminal and network already have dedicated means of communication.

Figure 2C:
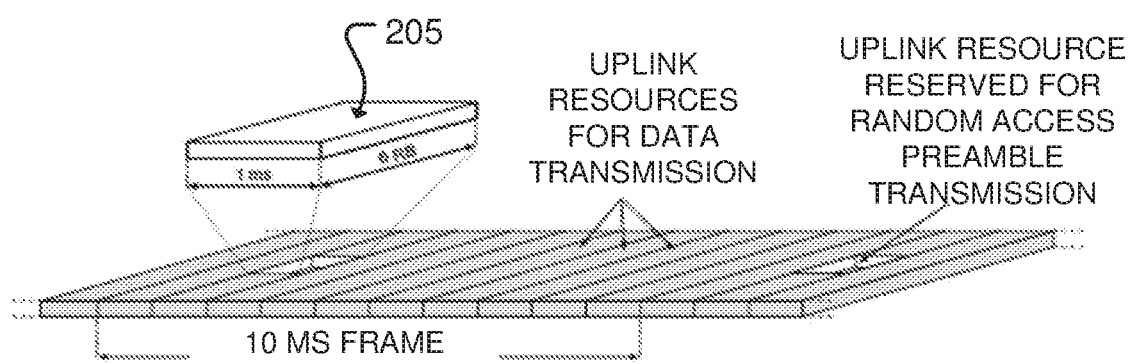
FIG. 2c is an illustration of random access preamble transmission in the time-frequency domain.

Which subset to select the preamble from, is given by the amount of data the terminal would like to, and from a power perspective can, transmit on the Physical Uplink Shared Channel, PUSCH, in the third random access step. A time/frequency resource to be used for these transmissions is illustrated in FIG. 2c, which is understood by reading "4G-LTE/LTE Advanced for Mobile Broadband" by E. Dahlman et al, Academic Press, 2011. The time/frequency resource 205 to be used is given by the common PRACH configuration of the cell, which can be further limited by an optional, UE specific mask, which limits the available PRACH opportunities for the given UE.

A second step S32 of the random access procedure comprises the Random Access Response. In the Random Access Response the eNodeB transmits a message on the Physical Downlink Shared Channel, PUSCH, containing the index of the random-access preamble sequences the network detected and for which the response is valid; the timing correction calculated by the random-access preamble receiver; a scheduling grant; as well as a temporary identify, TC-RNTI, used for further communication between the UE and network. A UE which does not receive any Random Access Response in response to its initial random-access preamble transmission of step 1 above within a pre-defined time window, will consider the attempt failed, and will repeat the random access pre-amble transmission, possibly with higher transmit power, up to a number of maximum of four times, before considering the entire random-access procedure failed.

The third step S33 of the random access procedure serves, e.g., to assign a unique identity to the UE within the cell, C-RNTI. In this third step, the UE transmits the necessary information to the eNodeB using the PUSCH resources assigned to the UE in the Random Access Response.

The fourth and last step S34 of the random-access procedure comprises a downlink message for contention resolution. The message of this fourth step is also known as the RRC Connection Setup message. Based on the contention resolution message each terminal receiving the downlink message will compare the identity in the message with identity transmitted in the third step. Only a terminal which observes a match between the identity received in the fourth step and the identity transmitted as part of the first step will declare the random access procedure successful, otherwise the terminal will need to restart the random access procedure.

The UE power to use in the random access attempt is calculated according to a specified formula, known from "3GPP TS 36.213 v.10.6.0. Physical layer procedures ", reproduced as Expression 1 below, with parameters carried in the system information. If the UE does not receive a RandomAccessResponse in the second step of the procedure, the transmit power of the following PRACH transmission is increased by a parameter delta value up until limited by the UE maximum power:

$$P_{PRACH} = \min\{P_{CMAX,c}(i), PREAMBLE\_RECEIVED\_TARGET\_POWER + PL_c\}\_[dBm] \quad \text{Expression 1:}$$

In Expression 1, $P_{CMAX,c}(i)$ is the configured UE transmitting power as defined in "3GPP TS 36.213 v.10.6.0. Physical layer procedures" for sub frame i of the first cell and $PL_c$ is the downlink path loss estimate calculated in the UE for the first cell and PREAMBLE_RECEIVED_TARGET_PO-WER is the initial power used for the preambles, i.e., before any potential power ramp-up.

As currently being discussed during the work with the 3GPP Coverage Enhancements, there are situations where a UE is unable to access the network due to Random Access Channel, RACK coverage problems, e.g., the UE has Broadcast Control Channel, coverage and can thus measure on the cell and read the cell's system information, but the network cannot receive any random access preamble attempts from the UE because the UE is power/coverage limited, and hence the received signal in the network is too weak.

In the situation as outlined above, it would be beneficial if it was possible for the UE to acquire E-UTRAN access with the assistance of the GERAN RACH procedures, and hence effectively extend the coverage of the E-UTRAN cell assuming that the coverage is limited by E-UTRAN RACH procedures only while the E-UTRAN user plane transfer procedures can be maintained. This is however not possible today since the UE will not be able to access the E-UTRAN network until the E-UTRAN radio conditions are more favorable, i.e., until it has moved to a position closer to the E-UTRAN base station, after which the network may trigger a handover to the E-UTRAN cell. One reason for this is that the access to the E-UTRAN cell after the UE has left the GERAN cell will still require E-UTRAN RACH access as per legacy methods as described earlier.

Furthermore, if the UE is coverage limited in this manner, it is quite likely that also the subsequent RRC Connection Request/MSG3 transmission from UE to network, as per the third step of the random access procedure described in the previous section, will also fail.

Additionally, it would in situations as the ones described above, as well as in the 'normal' IRAT handover case from GERAN to E-UTRAN, be beneficial if it was possible to provide contention-free access for the UE in the target cell upon IRAT HO, i.e., pre-reserving PRACH resources and/or preambles to be used by the UE in the target E-UTRAN cell. This is already today possible with intra-RAT handovers between two LTE cells, but not in the IRAT case as discussed here.

Finally, for the 5G High-Frequency case discussed earlier, the very high pathloss in the very high frequency bands considered for 5G makes it difficult for network and UEs to communicate without the use of advanced multi-antenna techniques such as, e.g., extensive beam forming. Since determination of the precoding matrices needed for beamforming are typically dependent on measurements (e.g. CSI measurements for LTE) that are not available prior to initial access (i.e. RACH), the UE will not be able to perform random access in such a node/network. So, this is a similar problem to the above disclosed, thus, albeit that the access technologies are different—the same (or a similar) solution should be possible.

The method of enabling access to the first wireless network will now be described using FIGS. 3, 4, 5 and 6. The method is, e.g., performed in the wireless device 10 of FIG. 1.

Figure 3:
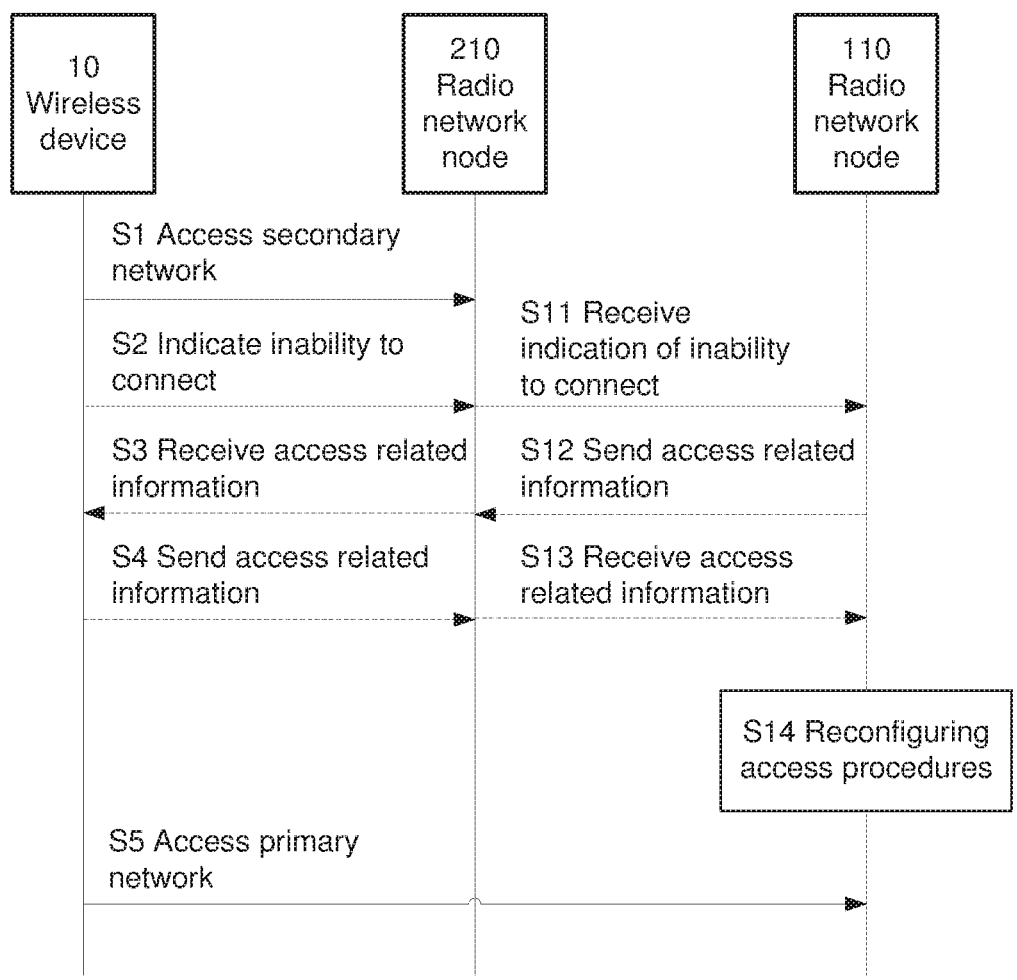
FIG. 3 illustrates an overview of the signaling in a system when enabling access to a first wireless network.

FIG. 3 is a signaling diagram showing an overview of the signaling in a system, comprising a wireless device 10 and first network node 110 and a second network node 210, when enabling access according to the technology disclosed herein. More specifically, FIG. 3 discloses an overview of all the messages going between the wireless device 10 and the network nodes 110, 210 when executing the methods in the respective device as will now be described referring to FIGS. 4, 5 and 6.

Figure 4:
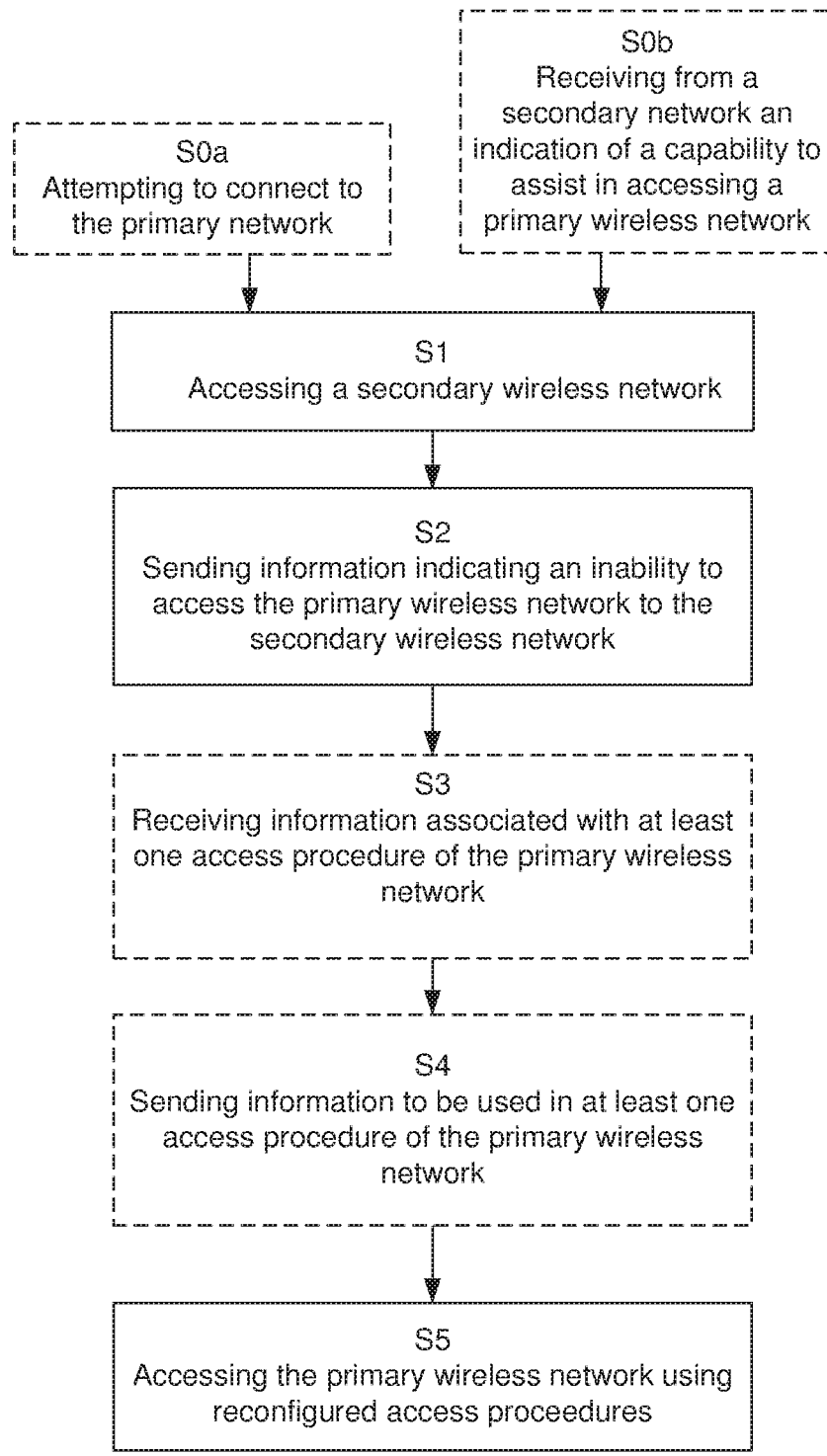
FIG. 4 is a flow chart illustrating the proposed method performed in a wireless device being unable to access a first wireless network, of enabling access to the first wireless network.

FIG. 4 shows a method, performed in a wireless device 10 being unable to access a first wireless network 100, of enabling access to the first wireless network 100. According to one aspect, the method is initiated when a wireless device attempts, step S0a, to connect to the first wireless network, but does not succeed. Another possibility is that the wireless device is informed about the existence of the first wireless network, but that it already knows that access is not possible. One could, e.g., assume that in 5G networks precoding or direction information will always be needed. According to one aspect of the proposed technique, the wireless device 10 receives, step S0b, from the second wireless network 200 an indication of a capability to assist in accessing the first wireless network 100. Hence, the second wireless network 200 may inform the wireless device that there is a first wireless network and that the second wireless network may assist the wireless device 10 in accessing it.

In one exemplary embodiment, the first network is not transmitting system information, e.g., beacon, sync signals etc. However, the wireless device may be aware of its existence. The second system may then request the first network to start transmitting system information such as beacon etc.

Then, the access procedure assisted by the second wireless network is initiated. The wireless device typically initiates the procedure. In the first step, the wireless device accesses, S1, the second wireless network 200. This implies that the wireless device and the secondary network have exchanged sufficient information to start exchanging data. In the example with the GERAN, this, e.g., implies performing a random access procedure, but it may also comprise making a handover to the secondary wireless network in other way. Note that, the connection to the second wireless network may have been established long before the attempt to access the first wireless network is started. Then this step may then just imply that the wireless device verifies that the connection is still there.

In the next step, the wireless device sends S2 information indicating an inability to access the first wireless network 100 to the second wireless network 200, for further distribution to the first wireless network 100. An inability to access the network implies, e.g., that the wireless device has attempted to access the network and failed as described above. The inability may also depend on that the first wireless network is "off", i.e., is not transmitting any system information. Hence, the second wireless network 200 tunnels this information to the first wireless network. Thereby, the wireless device enables the first wireless network 100 to reconfigure at least one access procedure parameter in the first wireless network 100 in order to improve the conditions for the wireless device when accessing first wireless network. This may be implemented in several ways, depending which network node and/or network that is in control of the access procedure. IF the network is off, the network may get a request to start to transmit system information.

According to one aspect, the information indicating an inability to access to the first wireless network is a request for the first wireless network to reconfigure at least one access procedure parameter. Then the indication is a request sent from UE that is tunneled via the second wireless network to first wireless network.

Another possibility is that the second wireless network will request the first wireless network to modify its access procedures. A further option is that the indication just comprises information about the inability and that the first wireless network then has to start acting on its own initiative based on the received information in order to improve the conditions for the wireless device. Improved conditions imply, e.g., increased capacity or increased coverage. According to one aspect, this implies that the information enables the first wireless network to reconfigure an access procedures parameter such that the coverage of an access channel is increased for the wireless device. This may be accomplished by increasing the power or by directing the receiver of the second wireless network towards the wireless device.

In the final step, the wireless device accesses S5 the first wireless network 100 utilizing at least one reconfigured access procedure. That the device utilizes the reconfigured access procedure expresses that the wireless device makes use of an access procedure having a reconfigured access procedure parameter. Reconfiguration is enabled in the previous step. Note that the wireless device does not necessarily change its behavior. The access procedure may be completely reconfigured on the network side by, e.g., muting other transmitters or by directing the receiver in a certain direction. Hence, this step may imply changes on network and/or on the wireless device side. However, the probability for successfully completing the access procedure is somehow improved for the wireless device.

According to one aspect of the disclosure, the method in a wireless device further comprises the step of receiving S3, from the second wireless network, information associated with at least one access procedure of the first wireless network 100. The received information is, e.g., a preamble as described in FIG. 3 or other code to use when accessing the first wireless network. The information may typically originate from first wireless network 100. The information may also be a request for massive repetitions, increased power or TTI bundling, i.e., performing extra/blind retransmissions in advance without receiving a NACK before) in order to improve the link budget.

According to one aspect of the disclosure, the received information comprises information about at least one access resource or preamble which is reserved for the wireless device 10. Hence, the network could then further improve the likelihood of the subsequent inter RAT handover, e.g., from GERAN to E-UTRAN by commanding the UE to use specific preambles and/or resources for this purpose, in contrast to the RACH procedure described in FIGS. 2a. According to this aspect, the step of accessing S5 the first wireless network 100 comprises using the reserved access resource or preamble.

One example in an LTE network is letting a UE perform PRACH access in the E-UTRAN cell that it is being handed over to, just as would be the case in the 'normal' IRAT handover scenario. But beforehand (via tunneling from E-UTRAN->GERAN) provide the UE with an already preselected LTE PRACH resource preamble to use in the E-UTRAN cell, i.e., provide contention-free access for the case of IRAT HO. The methodology of contention-free access exists already for intra-LTE handovers, but not for this IRAT case. One possibility is to implement the intra-RAT handover interfaces in the GERAN node, so that the GERAN can signal the contention free resource towards the first E-UTRAN node using the X2 interface. In the case of a multi-RAT base station this is very straight forward. Hence, according to this aspect, the step of accessing S5 the first wireless network 100 comprises using the reserved access resource or preamble.

According to one aspect of the disclosure, the received information comprises precoding information and wherein the step of accessing S5 the first wireless network 100 comprises using the received precoding information. This step may, e.g., imply that the wireless device is informed about a precoding matrix to use in order to direct the transmission for accessing the first wireless network 100 in the optimal physical direction. According to one aspect the wireless device may actually turn/tilt the entire antenna system, which in some special case may be one possibility for a vehicle mounted system. Precoding may also be performed in the signal-space.

As an example embodiment of how received information may be used consider the following example relating to a 5G VL-MIMO system. For TDD systems, e.g., a 5G VL-MIMO system where the UE has a few antennas compared to the network, the functionality for enabling random access to the 5G-system is more straightforward. In this case the first wireless network is the 5G VL-MIMO system and the second wireless network is, for example, E-UTRAN or GERAN. The reason that the procedure is easier here is that the additional gain needed can be won by a suitable choice of antenna weights on the base station side. Using reciprocity, it is sufficient to listen on a UE UL transmission to enable operation between UE and base station. In this case the needed functionality is that the UE can be sufficiently synchronized and assigned a RACH preamble to enable the 5G base station to do reception of the RACH.

In this example the procedure is started as described above, by the wireless device 10 indicating an inability to connect to the network. In response, the second base station sends the RACH preamble (i.e. the radio signal used for random access to the first wireless network) to be used by the UE.

According to one aspect, the second wireless network further signals the timing and frequency resource used for the RACH procedure using the RACH preamble to the UE and the first wireless network. The first wireless network listens to the time and frequency resource and correlates the received signal using RACH preamble as signaled by the second wireless network. The first wireless network then continues the RACH procedure using the antenna weights determined from the RACH preamble reception from the UE.

For the integration of this new functionality into the mobility framework of the 3GPP core network the configuration messages needed are specific for the choice of first wireless network and second wireless networks. That this is possible is quite clear as mobility is assumed to be supported in the first wireless network but the interfaces is different, e.g., E-UTRAN enables intra-RAT mobility through X2 and S1-MME. Furthermore, the case of a first 5G network the naming of the network entities and interfaces implementing the functionality described is unknown.

According to one aspect of the disclosure, the method in a wireless device further comprises the step of sending S4 information to be used in at least one access procedure in the first wireless network 100, to the second wireless network 200 for further distribution to the first wireless network 100. This aspect implies that the wireless device sends information to the second wireless network, which is supposed to facilitate the connection to the first wireless network. One example of such information is measurement reports on at least one signal transmitted from the first wireless network.

According to one aspect, the step of receiving S3 information associated with at least one access procedure comprises receiving S3c from the first wireless network 100 a request to transmit at least one reference signal. Then, the method further comprises transmitting S4c the at least one reference signal. For example the E-UTRAN commands a UE to start transmitting a reference signal, e.g., LTE sounding reference signals whilst still in GERAN in order to provide the LTE RAN with a better estimate of the uplink conditions for the UE. This mechanism is currently not supported by the current 3GPP standard, and hence needs to be standardized. This could include letting the UE indicate at an early stage to the GERAN to which E-UTRAN cell it tried to perform access, which would make it easier for the GERAN cell to know which E-UTRAN node to contact.

Letting the UE do dedicated uplink transmissions in E-UTRAN can also enable the network to time align with the UE. Further enhancements of this procedure could use the GERAN time alignment or a dedicated PUSCH transmission designed for time alignment purposes, similar to RACH.

It is, in the examples above, assumed that the network knows the neighbor relations between the base stations, for example through intra-rat Automatic Neighbor Relation, ANR, functionality. For some cases, e.g., when the first RAT is 5G with VL-MIMO base stations, one important use case is that the second base station uses the same physical position as the first 5G base station. This enables the assumption that some basic radio parameters are the same between the first and second base station, for example, the timing between UL and DL for synchronization purposes.

The corresponding method performed in a first network node, or in several network nodes, in a first wireless network will now be explained in further detail. In principle, the functionality could be distributed between two or more processing nodes in the first wireless network, where each node has its own complement of processing circuitry and memory and communication interfaces. However, for simplicity, in this example the method is performed in one network node in the first wireless network.

Figure 5:
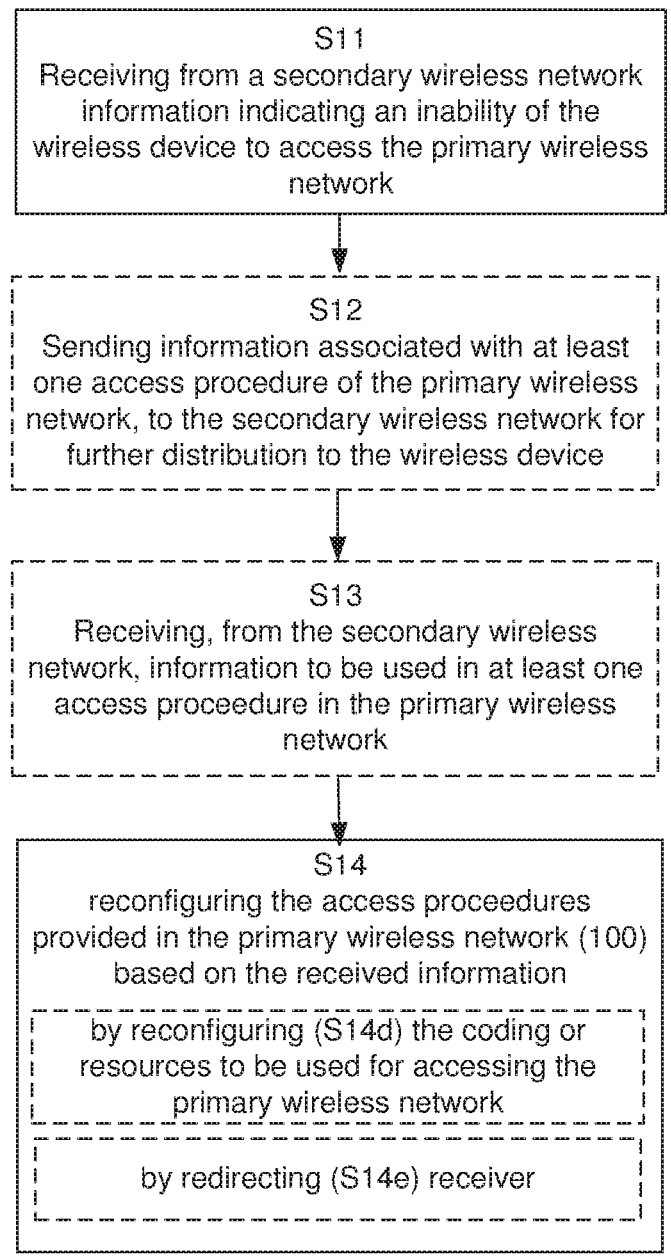
FIG. 5 is a flow chart illustrating the proposed method performed in first network node in a first wireless network of enabling a wireless device being unable to access a first wireless network, to access the first wireless network.

FIG. 5 is a flow chart illustrating the proposed method performed in first network node in a first wireless network of enabling a wireless device being unable to access a first wireless network, to access the first wireless network. As explained above the method is typically started by a wireless device 10 that indicates, step S1 of FIG. 4, an inability to connect to the first system. This indication is then forwarded by the second wireless network to the first wireless network. The message transmitted by the wireless device may be directly forwarded, i.e., without any processing in the second wireless network. Alternatively, a new message comprising information about the inability is sent from the first network to the second wireless network.

Hence, in the first step executed in the first wireless network, the first network node receives S11 from a second wireless network 200 information indicating an inability of the wireless device 10 to access the first wireless network 100. Referring back to FIG. 4, this step implies that the information that the wireless device 10 is unable to access the primary wireless network, as sent in S2, has reached the first wireless network 100. As explained above, this may be accomplished in several ways. One possibility is that the information is tunneled all the way to the first wireless network. However, there may as well be several intermediate nodes involved in forwarding and analyzing the information. The principle is that the first wireless network gets hold of the information that a modification is needed. Hence, after receiving the indication one or several intermediate steps are typically performed, which will be exemplified below. Hence, according to some aspects of the disclosure the method further comprises that data is exchanged between the wireless device and the first wireless network, as will be explained in relation to steps S12 and S13.

Then, the first network node reconfigures S14 at least one access procedure parameter in the first wireless network 100 based on the received information in order to improve the conditions for the wireless device 10 when accessing first wireless network 100. The reconfiguration may be done before or after data exchange, depending on how the reconfiguration is performed. According to one aspect of the disclosure, the at least one access procedure parameter is reconfigured such that coverage of the first wireless network is modified to provide coverage for the wireless device 10. Hence, the coverage is, e.g., extended by modifying the physical direction of receiver of the first network node 110.

According to one aspect of the disclosure, the method further comprises sending S12 information associated with the at least one reconfigured access procedure parameter in the first wireless network 100 to the second wireless network 200 for further distribution to the wireless device 10. The information is, e.g., a preamble, resource information, a request for measurements etc as described in the different examples above and below.

According to one aspect of the disclosure, the method further comprises receiving S13, from the second wireless network 200, information to be used in at least one access procedure in the first wireless network 100. As an example, the wireless device 10 may, e.g., send measurements performed on a reference signal transmitted from the first wireless network 110. By receiving such measurements the first wireless network node may, e.g., adapt its receiver depending on the precoding used by the wireless device or redirect its receiver in order to optimize the reception when the wireless device accesses the network. Hence, according to one aspect the step of reconfiguring S14 the access procedure or procedures comprises informing the receiver of the radio network node 110 about the precoding used by the wireless device. The receiver may then be adjusted to match the precoder used by the wireless device.

According to one aspect the step of reconfiguring S14 the access procedure or procedures comprises reconfiguring the coding or resources to be used for S14d accessing the first wireless network 100.

The corresponding method performed in a second network node, or in several network nodes, in a second wireless network will now be explained in further detail. In principle, the functionality could be distributed between two or more processing nodes, where each node has its own complement of processing circuit and memory and communication interfaces. However, for simplicity, in this example the method is performed in one network node in the second wireless network.

Figure 6:
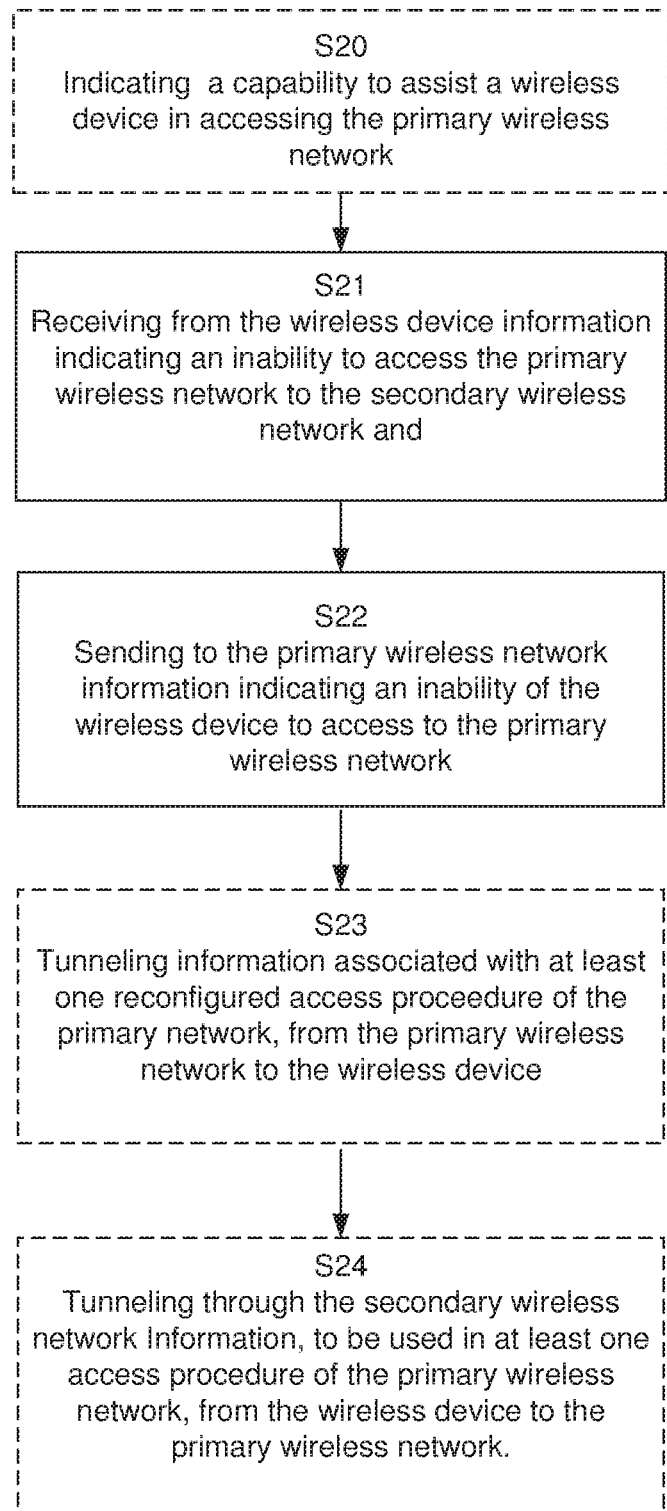
FIG. 6 is a flow chart illustrating the proposed method performed in second network node in a second wireless network, of enabling a wireless device being unable to access a first wireless network, to access the first wireless network.

FIG. 6 is a flow chart illustrating the proposed method performed in second network node in a second wireless network, of enabling a wireless device being unable to access a first wireless network, to access the first wireless network. As described above the procedure is initiated when a wireless device 10 indicates an inability to connect to the wireless network 110.

In the first step of the method performed in the second wireless network, the second network node receives S21 from the wireless device 10 information indicating an inability to access the first wireless network. The second wireless network may then either just forward the information to the first wireless network. In this case the logic in determining how to modify he access procedure will be placed in the first wireless network. Alternatively, the second wireless network processes the received indication.

In the next step the second network node sends S22 to the first wireless network 200 information indicating an inability of the wireless device 10 to access to the first wireless network 100, thereby enabling the first wireless network 100 to reconfigure at least one access procedure parameter in the first wireless network 100 to increase the coverage for the device. This could be implemented in several ways. For example, the information received in the first step could be a tunneled message, i.e., a message sent from the wireless device which is forwarded to the first wireless network without any analysis in the second wireless network. Tunneling is typically used when one tunnels info in a transparent manner through some other node or network. However, there could also be a direct interface between both networks serving the very same purpose.

According to one aspect the method further comprises indicating S20 a capability to assist a wireless device 10 in accessing the first wireless network 100. One option is to broadcast system information stating that: "There is a first wireless network and if you want to access it please use me".

According to one aspect, the method further comprises tunneling S23 information associated with at least one access procedure of the first wireless network 100, from the first wireless network 100 to the wireless device 10. Such information is, e.g., a request to transmit a sounding signal as will be further described in relation to FIG. 9.

According to one aspect, the method further comprises tunneling S24 information to be used in at least one access procedure of the first wireless network 100, from the wireless device 10 to the first wireless network 100. As described above the access procedure may be assisted by sending, e.g., measurements on at least one signal transmitted from the first wireless network.

Figure 7:
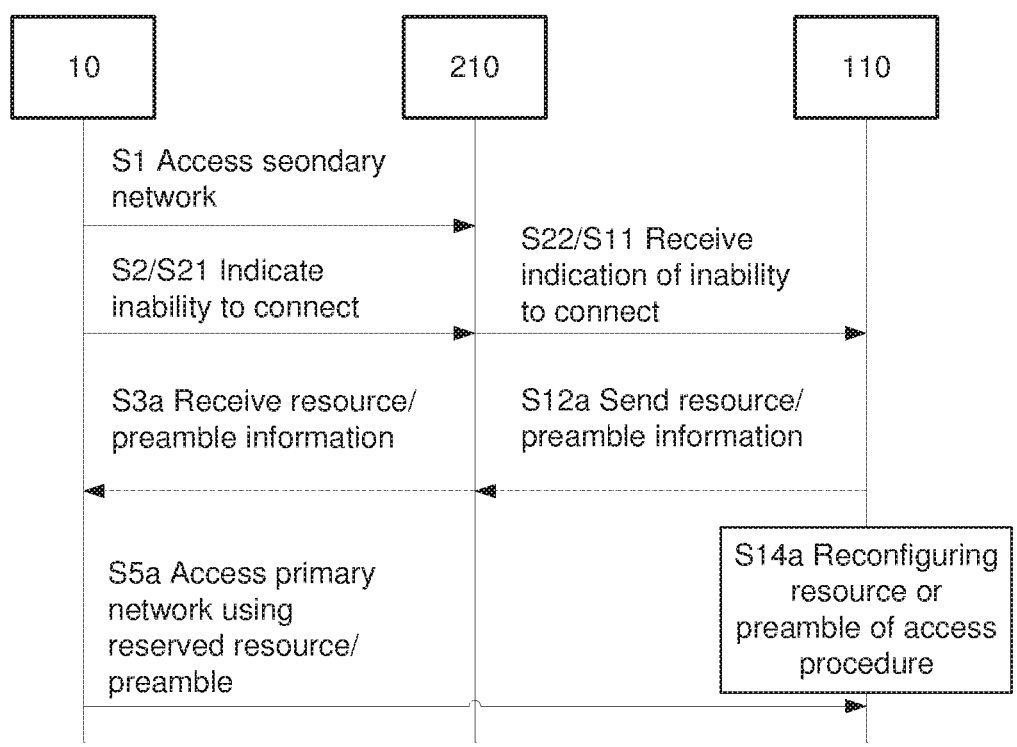
FIG. 7 illustrates an overview of the signaling in a system when enabling access to a first wireless network according to a first example embodiment.

FIG. 7 illustrates an overview of the signaling in a system when enabling access to a first wireless network according to a first example embodiment.

In this example the wireless device first accesses S1 the secondary network and sends an indication of inability to connect to the network to the second wireless network. The indication is forwarded S21,S22 by the second wireless network and received by the second wireless network.

The first wireless network sends information S12a about at least one access resource or preamble which is reserved for the wireless device 10 to the second wireless network, for further distribution to the wireless device 10. The wireless device 10 receives S3a the resource and/or preamble information. Finally the wireless device accesses S5a the network using the received information.

Figure 8:
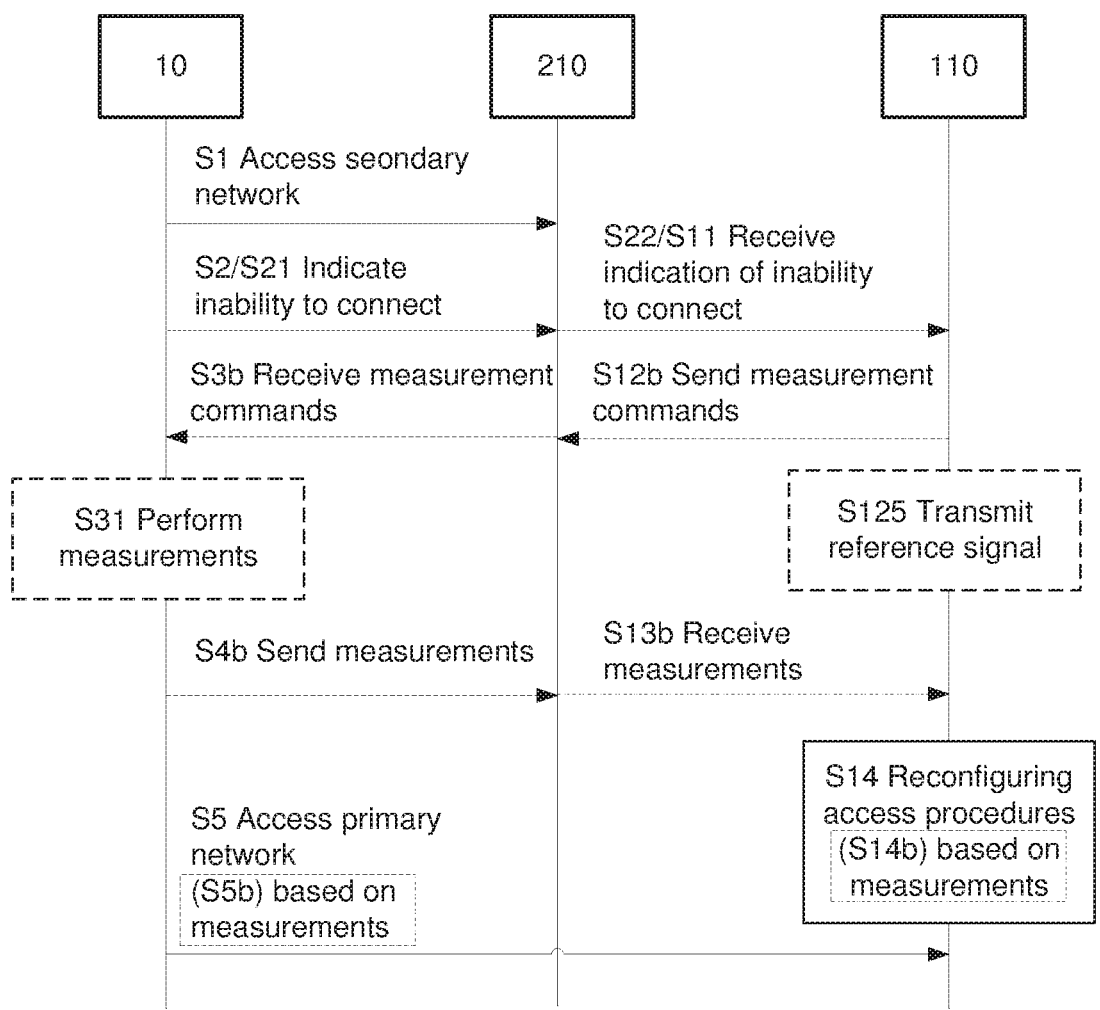
FIG. 8 illustrates an overview of the signaling in a system when enabling access to a first wireless network according to a second example embodiment.

FIG. 8 illustrates an overview of the signaling in a wireless network when enabling access to a first wireless network according to a second example embodiment. According to another example embodiment the proposed technique enhances the existing, and earlier described RACH access procedure for a wireless device being a multi-RAT capable UE. In this example the first RAT is E-UTRAN and the second RAT is GERAN.

The UE is configured, according to legacy procedures, with a set of camping/access rules/strategies, which are determined between the core network and the UE. Hence the radio access network is typically not aware of this set of rules/strategies. Now, for the sake of this disclosure, assume that this configuration is so that the preferred (first) RAT for camping for this UE is E-UTRAN. If now, the UE finds an E-UTRAN cell that suffices requirements for camping/access, but is unable to connect to it, the UE will now instead perform access S1 in a covering GERAN cell that possibly indicates, e.g., in the system information its capability to support assistance for E-UTRAN RACH access procedures/LTE coverage extension, if such one is available. Upon doing so, the UE will indicate S2/21 explicitly to the second wireless network that it failed to connect to the E-UTRAN and also to which specific cell.

The GERAN will thereafter inform S22/S11 the E-UTRAN about this situation—, i.e., that a UE failed to make access to the specific E-UTRAN cell but is now connected to a GERAN cell. Possibly, some positioning and/or some initial measurement information regarding the UE could be included together with this information.

The E-UTRAN may thereafter (if not doing so already) start transmission S125 of UE and/or cell-specific reference signals, which the UE is subsequently commanded S12b/S3b to measure on via a commands tunneled from E-UTRAN to GERAN. For transmission in GERAN, the corresponding measurement command needs to be updated accordingly.

The UE will now perform measurements S31 on these E-UTRAN reference symbols, where after the resulting CSI measurement reports (i.e. CQI and rank measurements) are tunneled back to the LTE RAN S4b/S13b. This actual tunneling mechanism existing today can probably be used (RIM, see 3GPP TS 48.018 (Release 10)), even though E-UTRAN measurement reports (e.g. the ENHANCED MEASUREMENT REPORT needs to be updated in order o convey CSI reports (today only RSRP/RSRQ can be included).

Now, the E-UTRAN has all the information it requires in order to actively enhance the downlink E-UTRAN coverage for the UE by means of activate coverage enhancing features such as, e.g., user-specific beamforming for this very UE, activation of TTI bundling or more robust encoding. Other possibilities include antenna tilt or other AAS related functionality.

Hence, a subsequent access attempt S5b such as a inter-RAT handover from GERAN to E-UTRAN will have a increased likelihood of success when using the measurements. This example embodiment is not restricted to GERAN to E-UTRAN, but the same principle may be implemented in any network.

Figure 9:
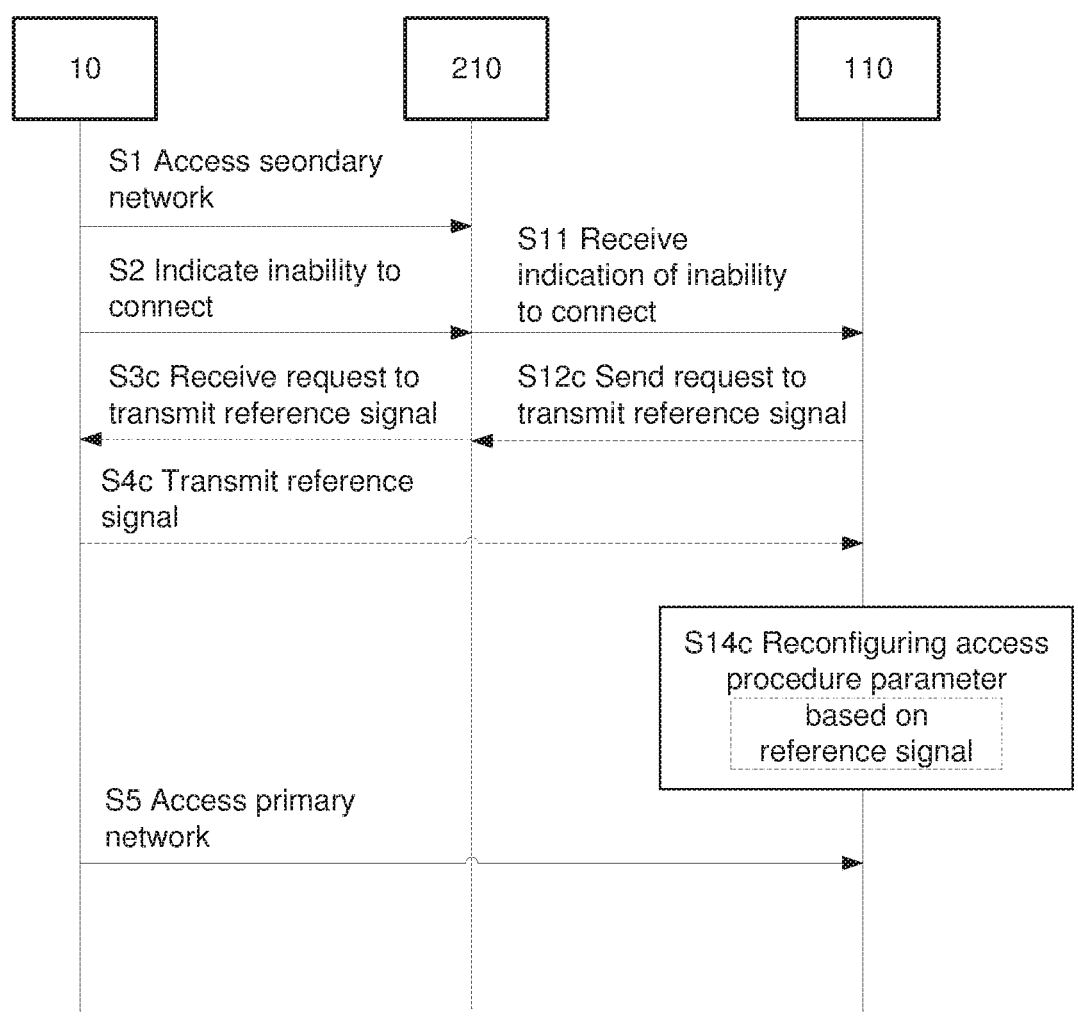
FIG. 9 illustrates an overview of the signaling in a system when enabling access to a first wireless network according to a third example embodiment.

FIG. 9 illustrates an overview of the signaling in a wireless network when enabling access to a first wireless network according to a third example embodiment. In this example, as in the other's the wireless device first accesses S1 the secondary network and sends an indication of an inability to connect to the network to the second wireless network. The indication is forwarded S21,S22 by the second wireless network and received by the second wireless network. In this example the first wireless network 100 then sends a request S12c for the wireless device 10 to transmit at least one reference signal. The wireless device receives S3c this request and starts to transmit S4c the requested reference signal.

For example, the E-UTRAN also command the UE to start transmitting, e.g., LTE sounding reference signals whilst still in GERAN in order to provide the LTE RAN with a better estimate of the uplink conditions for the UE. This mechanism is currently not supported by the current 3GPP standard, and hence need to be standardized. This could include letting the UE indicate at an early stage to the GERAN to which E-UTRAN cell it tried to perform access, which would make it easier for the GERAN cell to know which E-UTRAN node to contact.

The reference signal is typically received S14c by the first wireless network node 110 and at least one access procedure parameter is modified S14c based on the reception, e.g., by calculating the channel between the wireless device and the first network node 110. Thereby the chance for a successful access procedure S5 increases.

Figure 10:
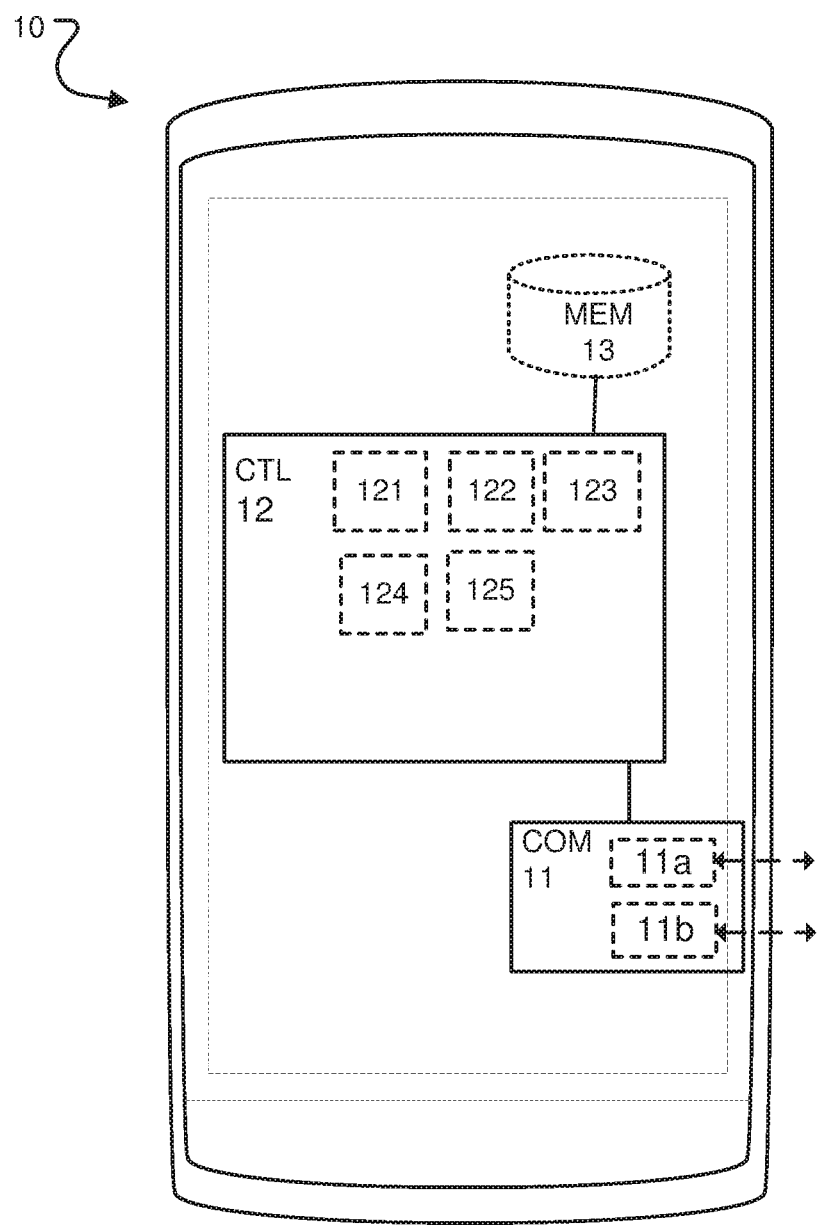
FIG. 10 is a schematic diagram illustrating a wireless device.

Turning now to FIG. 10, a schematic diagram illustrating some modules of an example embodiment of a wireless device 10 configured to access a first wireless network 100, when the wireless device is unable to access the first wireless network 100, will be described. In this application the term wireless device 10 is any wireless device able to wirelessly connect to the first and second wireless network. The wireless device is typically a user equipment, UE, but is may as well be a M2M device.

The wireless device 10 comprises a controller, CTL, or a processing circuitry 12 that may be constituted by any suitable Central Processing Unit, CPU, microcontroller, Digital Signal Processor, DSP, etc. capable of executing computer program code. The computer program may be stored in a memory, MEM 13. The memory 13 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory.

The wireless device 10 further comprises a radio communication interface (i/f), 11. The wireless communication interface 11 is arranged for wireless communication with wireless devices within range of the wireless device 10 The radio communication interface 11 may be adapted to communicate over one or several radio access technologies. If several technologies are supported, the node typically comprises several communication interfaces, e.g., one WLAN or Bluetooth communication interface 11a and one cellular communication interface 11b. a radio communication interface 111 configured to communicate with the first and second wireless networks 100, 200.

When the above-mentioned computer program code is run in the processing circuitry 11 of the wireless device 10, it causes the wireless device 10 to send information indicating an inability to access the first wireless network 100 to the second wireless network 200, for further distribution to the first wireless network 100, thereby enabling the first wireless network 100 to reconfigure at least one access procedure parameter in the first wireless network 100 in order to improve the conditions for the wireless device when accessing first wireless network and access the first wireless network 100 utilizing at least one reconfigured access procedure.

According to one aspect of the disclosure the processing circuitry 12 comprises one or several of:
- a first access module 121 configured to access a second wireless network 200,
- a first sender module 122 configured to send information indicating an inability to access the first wireless network to the second wireless network, for further distribution to the first wireless network, thereby enabling the first wireless network to reconfigure at least one access procedure parameter in the first wireless network in order to improve the conditions for the wireless device when accessing first wireless network,
- a second access module 123 configured to access the first wireless network utilizing at least one reconfigured access procedure.

According to one aspect the disclosure the processing circuitry 12 further comprises a receiver module 124 configured to receive, from the second wireless network 200, information associated with at least one access procedure of the first wireless network 100.

According to one aspect the disclosure the processing circuitry 12 further comprises a second sender module 125 configured to send information to the second wireless network 200 for further distribution to the first wireless network 100.

The first, second access modules 121, 123 and the first and second sender modules 122, 125 and the receiver module 124 are implemented in hardware or in software or in a combination thereof. The modules 121, 122, 123, 124, 125 are according to one aspect implemented as a computer program stored in a memory 13 which run on the processing circuitry 12. The wireless device 10 is further configured to implement all the aspects of the disclosure as described in relation to the methods above. The processing circuitry also comprises the corresponding modules.

According to one aspect the disclosure further relates to the above mentioned computer program, comprising computer readable code which, when run on an wireless device, causes the node to perform any of the aspects of the method described above.

Figure 11A:
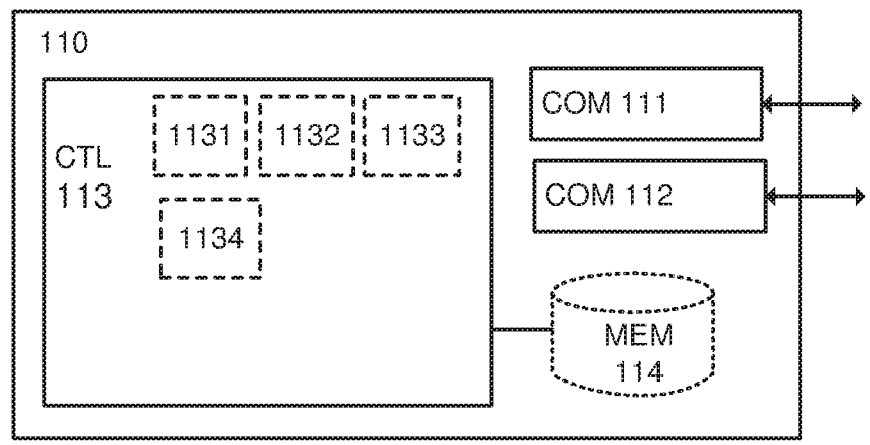
FIG. 11a is a schematic diagram illustrating a first node.

Turning now to FIG. 11a, a schematic diagram illustrating some modules of an example embodiment of a first network node 110 being configured to enable a wireless device 10, being unable to access a first wireless network 100, to access the first wireless network 100, will be described. In this application the term network node is generally used. A network node is any node in the wireless communication network, e.g., a RBS or an eNodeB.

The first network node 110 comprises a controller, CTL, or a processing circuitry 113 that may be constituted by any suitable Central Processing Unit, CPU, microcontroller, Digital Signal Processor, DSP, etc. capable of executing computer program code. The computer program may be stored in a memory, MEM 114. The memory 114 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory.

The first network node 110 further comprises a radio communication interface (i/f), 111. The wireless communication interface 111 is arranged for wireless communication with wireless devices within range of the first network node 110. The radio communication interface may be adapted to communicate over one or several radio access technologies. If several technologies are supported, the node typically comprises several communication interfaces, e.g., one WLAN or Bluetooth communication interface 12a and one cellular communication interface 12b. a radio communication interface 111 configured to communicate with the wireless device 10.

The first network node 110 further comprises a network communication interface (i/f), 112. The network communication interface 112 is arranged for wireless communication with a second wireless network. If the method is performed in a distributed system, the network communication interface 112 may be implemented in a separate node within the first wireless network.

When the above-mentioned computer program code is run in the processing circuitry 11 of the first network node 110, it causes the first network node 110 to receive, using the network communication interface 112, from the second wireless network 200 information indicating an inability of the wireless device 10 to access the first wireless network 100, and to reconfigure an access procedure parameter in the first wireless network 100 based on the received information.

According to one aspect of the disclosure the controller comprises one or several of:
- a first receiver module 1131 configured to receive from a second wireless network 200 information indicating an inability of the wireless device 10 to access the first wireless network 100, and
- a reconfiguring module 1132 configured to reconfigure an access procedure or procedures provided in the first wireless network 100 based on the received information in order to improve the conditions for the wireless device 10 when accessing first wireless network 100.

According to one aspect of the disclosure the processing circuitry 113 further comprises a sender module 1133 configured to send information associated with the at least one access procedure of the first wireless network 100 to the second wireless network 200 for further distribution to the wireless device 10.

According to one aspect of the disclosure the processing circuitry 113 further comprises a second receiver module 1134 configured to receive S13, from the second wireless network 200, information to be used in at least one access procedure in the first wireless network 100.

The first and second receiver modules 1131, 1134, the reconfiguring module 1132 and the sender module 1133 are implemented in hardware or in software or in a combination thereof. The modules 1131, 1132, 1133, 1134 are according to one aspect implemented as a computer program stored in a memory 214 which run on the processor 213. The processing circuitry 213 is further configured to implement all the aspects of the disclosure as described in relation to the methods above and it also comprises the corresponding modules.

According to one aspect the disclosure further relates to the above mentioned computer program, comprising computer readable code which, when run on a first network node in a first wireless network, causes the first network node to perform any of the aspects of the method described above.

Figure 11B:
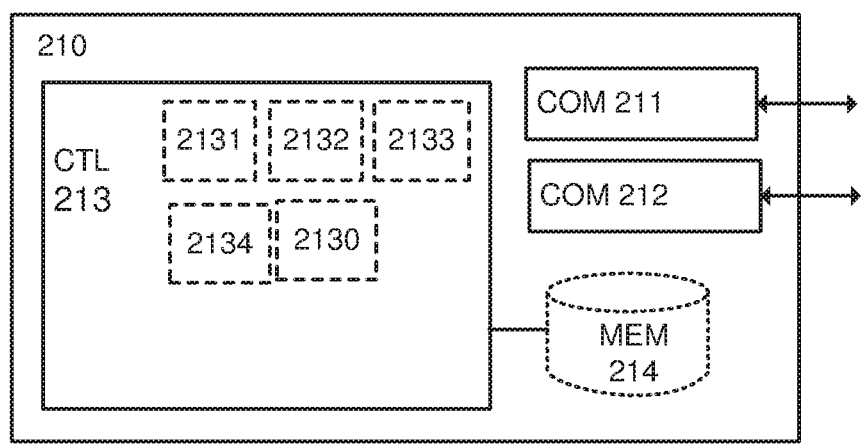
FIG. 11b is a schematic diagram illustrating a second node.

Turning now to FIG. 11b, a schematic diagram illustrating some modules of an example embodiment of a second network node 210 in a second wireless network being configured to enable a wireless device 10, being unable to access a first wireless network 100, to access the first wireless network 100, will be described. In this application the term network node is generally used. The network node is any node in the wireless communication network, e.g., a RBS or an eNodeB.

The second network node 210 comprises a controller, CTL or a processing circuitry 213 that may be constituted by any suitable Central Processing Unit, CPU, microcontroller, Digital Signal Processor, DSP, etc. capable of executing computer program code. The computer program may be stored in a memory, MEM 114. The memory 214 can be any combination of a Read And write Memory, RAM, and a Read Only Memory, ROM. The memory 214 may also comprise persistent storage, which, for example, can be any single one or combination of magnetic memory, optical memory, or solid state memory or even remotely mounted memory.

The second network node 210 further comprises a radio communication interface (i/f), 211. The radio communication interface 111 is arranged for wireless communication with wireless devices within range of the second network node 210. The radio communication interface may be adapted to communicate over one or several radio access technologies. If several technologies are supported, the node typically comprises several communication interfaces, e.g., one WLAN or Bluetooth communication interface 12a and one cellular communication interface 12b. a radio communication interface 111 configured to communicate with the wireless device 10.

The second network node 210 further comprises a network communication interface (i/f), 212. The network communication interface 212 is arranged for communication with the first wireless network. If the method is performed in a distributed system, the network communication interface 212 may be implemented in a separate node within the second wireless network, i.e., not necessarily in the network node implementing the access procedure.

When the above-mentioned computer program code is run in the processing circuitry 211 of the second network node 210, it causes the second network node 210 to receive, using the radio communication interface 211, from the wireless device 10 information indicating an inability to access the first wireless network and send, using the network communication interface 212, to the first wireless network 200 information indicating an inability of the wireless device 10 to access to the first wireless network 100, thereby enabling the first wireless network 100 to reconfigure at least one access procedure parameter in the first wireless network 100 to increase the coverage for the wireless device 10.

According to one aspect of the disclosure the controller 213 comprises one or several of:
- a receiver module 2131 configured to receive from the wireless device 10 information indicating an inability to access the first wireless network 100, and
- a sender module 2132 configured to send S22 to the first wireless network 100 information indicating an inability of the wireless device 10 to access to the first wireless network 100, thereby enabling the first wireless network 100 to reconfigure at least one access procedure parameter in the first wireless network 100 in order to improve the conditions for the wireless device 10 when accessing first wireless network 100.

According to one aspect the disclosure the processing circuitry 2130 further comprises an indicator 1133 configured to indicate a capability to assist a wireless device in accessing the first wireless network 100.

According to one aspect the disclosure the processing circuitry 2133 further comprises a first tunneling module 2133 configured to tunnel information associated with at least one access procedure of the first wireless network 100, from the first wireless network 100 to the wireless device 10.

According to one aspect the disclosure the processing circuitry 2134 further comprises a second tunneling module 2133 configured to tunnel information to be used in at least one access procedure of the first wireless network 100, from the wireless device 10 to the first wireless network 100.

The indicator 2130, the receiver module 2131 and the sender module 2132 and the first and second tunneling modules 2133, 2134 are implemented in hardware or in software or in a combination thereof. The modules 2130, 2131, 2132, 2133, 2134 are according to one aspect implemented as a computer program stored in a memory 214 which runs on the processor 213. The processing circuitry 213 is further configured to implement all the aspects of the disclosure as described in relation to the methods above and it also comprises the corresponding modules.

According to one aspect the disclosure further relates to the above mentioned computer program, comprising computer readable code which, when run on an node in a second wireless network, causes the second network node to perform any of the aspects of the method described above.

What is claimed is:

1. A method, performed in a wireless device being unable to access a first wireless network via a first network node, of enabling access to the first wireless network, the method comprising:
   accessing a second wireless network via a second network node;
   sending information indicating an inability to access the first wireless network to the second network node, for further distribution to the first network node, thereby enabling the first wireless network to reconfigure at least one access procedure parameter in the first wireless network in order to improve the conditions for the wireless device when accessing the first wireless network;
   obtaining, from the second wireless network, information regarding the at least one reconfigured access procedure parameter; and
   subsequently accessing the first wireless network, utilizing the at least one reconfigured access procedure parameter.

2. The method of claim 1, further comprising receiving, from the second wireless network, information associated with at least one access procedure of the first wireless network.

3. The method of claim 2, wherein the received information comprises information about at least one access resource or preamble that is reserved for the wireless device, and wherein the step of accessing the first wireless network comprises using the reserved access resource or preamble.

4. The method of claim 3, wherein the step of receiving information associated with at least one access procedure comprises receiving, from the first wireless network, a request to transmit at least one reference signal; and wherein the method further comprises transmitting the at least one reference signal.

5. The method of claim 2, wherein the received information comprises precoding information, and wherein the step of accessing the first wireless network comprises using the received precoding information.

6. The method of claim 1, further comprising sending, to the second network node for further distribution to the first network node, information to be used in at least one access procedure in the first wireless network.

7. The method of claim 1, wherein the information indicating an inability to access to the first wireless network is a request for the first wireless network to reconfigure at least one access procedure parameter in the first wireless network.

8. A non-transitory computer-readable medium comprising, stored thereupon, a computer program comprising computer program code that, when executed in a wireless device being unable to access a first wireless network via a first network node, causes the wireless device to:
   access a second wireless network via a second network node;
   send information indicating an inability to access the first wireless network to the second network node, for further distribution to the first network node, thereby enabling the first wireless network to reconfigure at least one access procedure parameter in the first wireless network in order to improve the conditions for the wireless device when accessing first wireless network;
   obtain, from the second wireless network, information regarding the at least one reconfigured access procedure parameter; and
   subsequently access the first wireless network, utilizing the at least one reconfigured access procedure parameter.

9. The non-transitory computer-readable medium according to claim 8, wherein the execution of the computer program code further causes the wireless device to:
   receive, from the second wireless network, information associated with at least one access procedure of the first wireless network.

10. The non-transitory computer-readable medium according to claim 9,
    wherein the received information comprises information about at least one access resource or preamble that is reserved for the wireless device, and
    wherein the execution of the computer program code further causes the wireless device to use the reserved access resource or preamble.

11. The non-transitory computer-readable medium according to claim 10, wherein in receiving the information associated with the at least one access procedure, the execution of the computer program code further causes the wireless device to:
    receive, from the first wireless network, a request to transmit at least one reference signal; and wherein the method further comprises transmitting the at least one reference signal.

12. The non-transitory computer-readable medium according to claim 9,
    wherein the received information comprises precoding information, and
    wherein the execution of the computer program code further causes the wireless device to use the received precoding information.

13. The non-transitory computer-readable medium according to claim 8, wherein the execution of the computer program code further causes the wireless device to:
    send, to the second network node for further distribution to the first network node, information to be used in at least one access procedure in the first wireless network.

14. The non-transitory computer-readable medium according to claim 8, wherein the information indicating an inability to access to the first wireless network is a request for the first wireless network to reconfigure at least one access procedure parameter in the first wireless network.

15. A method, performed in a second network node in a second wireless network, of enabling a wireless device being unable to access a first wireless network via a first network node to access the first wireless network, the method comprising the steps:
    receiving, from the wireless device, information indicating an inability to access the first wireless network;
    sending, to the first network node in the first wireless network, information indicating an inability of the wireless device to access to the first wireless network, thereby enabling the first wireless network to reconfigure at least one access procedure parameter in the first wireless network in order to improve the conditions for the wireless device when accessing first wireless network; and
    sending the at least one reconfigured access procedure parameter to the wireless device.

16. The method according to claim 15, further comprising indicating a capability to assist a wireless device in accessing the first wireless network.

17. The method according to claim 15, further comprising tunneling information associated with at least one access procedure of the first wireless network, from the first wireless network to the wireless device.

18. The method according to claim 15, further comprising tunneling information to be used in at least one access procedure of the first wireless network, from the wireless device to the first wireless network.

19. A non-transitory computer-readable medium comprising a computer program code that, when executed by a second network node in a second wireless network, causes the second network node to:

receive, from a wireless device, information indicating an inability to access a first wireless network;

send, to a first network node in the first wireless network, information indicating an inability of the wireless device to access to the first wireless network, thereby enabling the first wireless network to reconfigure at least one access procedure parameter in the first wireless network in order to improve the conditions for the wireless device when accessing first wireless network; and send the at least one reconfigured access procedure parameter to the wireless device.

20. The non-transitory computer-readable medium according to claim 19, wherein the execution of the computer program code further causes the second network node to: tunnel information associated with at least one access procedure of the first wireless network, from the first wireless network to the wireless device.

* * * * *